(12) United States Patent
Takei et al.

(10) Patent No.: US 10,461,327 B2
(45) Date of Patent: Oct. 29, 2019

(54) POSITIVE ELECTRODE FOR NON-AQUEOUS ELECTROLYTE SECONDARY BATTERY AND NON-AQUEOUS ELECTROLYTE SECONDARY BATTERY

(71) Applicant: SAMSUNG SDI CO., LTD., Yongin-si, Gyeonggi-do (KR)

(72) Inventors: Yuki Takei, Yongin-si (KR); Kenichi Kawase, Yongin-si (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 150 days.

(21) Appl. No.: 15/471,647

(22) Filed: Mar. 28, 2017

(65) Prior Publication Data

US 2017/0288220 A1   Oct. 5, 2017

(30) Foreign Application Priority Data

Mar. 29, 2016  (JP) ................................. 2016-066097
Nov. 9, 2016   (KR) ......................... 10-2016-0148841

(51) Int. Cl.
*H01M 4/505* (2010.01)
*H01M 4/62* (2006.01)
*H01M 10/0569* (2010.01)
*H01M 4/525* (2010.01)
*H01M 4/02* (2006.01)

(52) U.S. Cl.
CPC ........... *H01M 4/505* (2013.01); *H01M 4/525* (2013.01); *H01M 4/625* (2013.01); *H01M 10/0569* (2013.01); *H01M 2004/028* (2013.01); *H01M 2300/004* (2013.01); *H01M 2300/0034* (2013.01)

(58) Field of Classification Search
None
See application file for complete search history.

(56) References Cited

U.S. PATENT DOCUMENTS

2012/0308885 A1* 12/2012 Yu ..................... H01M 4/661
                                                    429/211
2014/0170452 A1   6/2014 Abe et al.
(Continued)

FOREIGN PATENT DOCUMENTS

JP   2013-134865    7/2013
JP   2014-120331    6/2014
KR   10-0362278    11/2002
(Continued)

*Primary Examiner* — Christopher P Domone
(74) *Attorney, Agent, or Firm* — Lee & Morse, P.C.

(57) ABSTRACT

A positive electrode for a non-aqueous electrolyte secondary battery includes a positive current collector, a coating layer including graphite, the coating layer coating the positive current collector, a positive active material having a composition represented by Chemical Formula 1, and a conductive auxiliary agent having a BET specific surface area of about 35 m2/g to about 350 m2/g, where Chemical Formula 1 is $Li_xNi_yMn_{2-y-z}M_zO_4$, wherein, M is at least one metal element selected from a transition metal and aluminum, the transition metal is a transition metal other than nickel (Ni) or manganese (Mn), and x, y, and z are within the ranges: $0.02 \leq x \leq 1.10$, $0.25 \leq y \leq 0.6$, and $0.0 \leq z \leq 0.10$.

10 Claims, 1 Drawing Sheet

(56) References Cited

U.S. PATENT DOCUMENTS

2014/0377659 A1\* 12/2014 Oljaca ................ H01M 4/0416
  429/221
2017/0324096 A1\* 11/2017 Korchev ........... H01M 10/0525

FOREIGN PATENT DOCUMENTS

| KR | 10-1256065 | 4/2013 |
| KR | 10-1536509 | 7/2015 |

\* cited by examiner

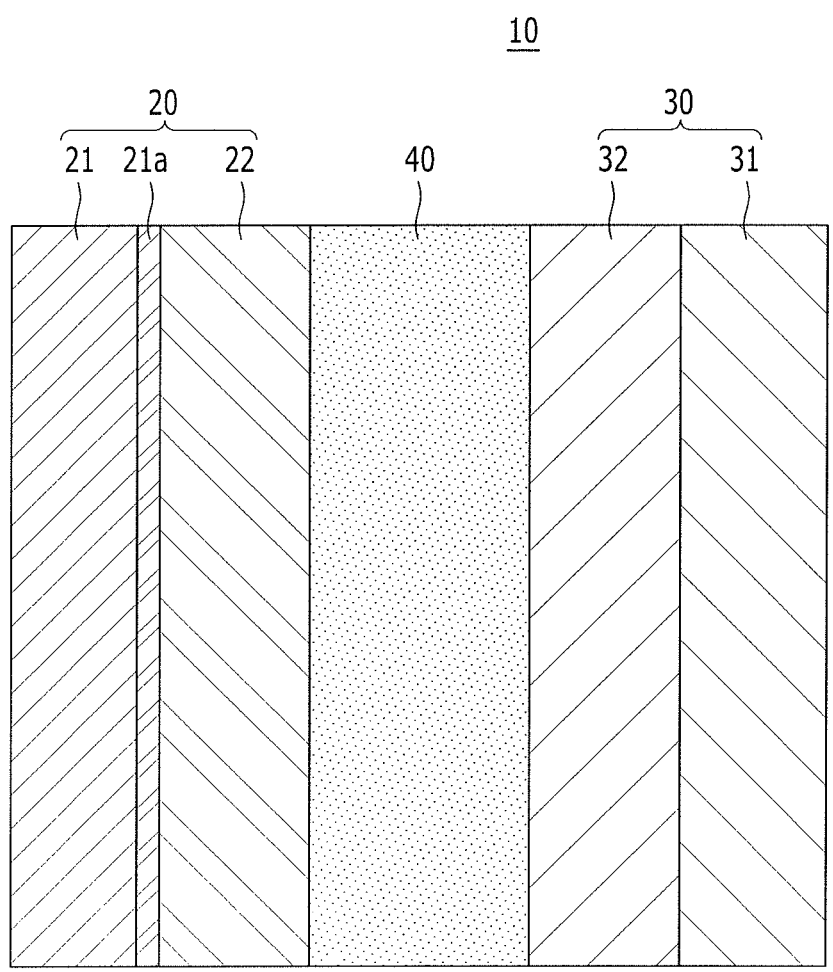

POSITIVE ELECTRODE FOR NON-AQUEOUS ELECTROLYTE SECONDARY BATTERY AND NON-AQUEOUS ELECTROLYTE SECONDARY BATTERY

CROSS-REFERENCE TO RELATED APPLICATION

Japanese Patent Application No. 2016-066097 filed in the Japan Patent Office on Mar. 29, 2016 and Korean Patent Application No. 10-2016-0148841 filed on Nov. 9, 2016, in the Korean Intellectual Property Office, and entitled: "Positive Electrode for Non-Aqueous Electrolyte Secondary Battery and Non-Aqueous Electrolyte Secondary Battery," is incorporated by reference herein in its entirety.

BACKGROUND

1. Field

Embodiments relate to a positive electrode for a non-aqueous electrolyte secondary battery and a non-aqueous electrolyte secondary battery.

2. Description of the Related Art

A non-aqueous electrolyte secondary battery having excellent high energy density is desirable. In order to increase the energy density of a non-aqueous electrolyte secondary battery, a positive active material having a spinel-type crystal structure has been suggested.

When this positive active material is used for the non-aqueous electrolyte secondary battery, the charge and the discharge at a voltage of greater than or equal to about 4.5V may be available.

However, the non-aqueous electrolyte secondary battery using this positive active material has a problem that a cycle-life is sharply deteriorated at a high temperature under a high voltage. This problem is caused due to the following reason.

When the battery is charged and discharged at a high temperature under a high voltage, metal ions are eluted from a positive current collector into an electrolyte solution. For example, when aluminum (Al) is used as the current collector, aluminum ions are eluted in the electrolyte solution. These metal ions are precipitated on a negative electrode and thus form a coating layer thereon. In addition, this coating layer increases battery resistance and thus causes the cycle-life characteristics deterioration. Or aluminum precipitated on the negative electrode, passes a separator, reaches a positive electrode, and thus causes a minute short circuit and deteriorates a cycle-life characteristics.

On the other hand, in order to suppress the elution of the metal ions from the current collector, technology of forming a passivation layer on the surface of the current collector is suggested. For example, when aluminum is used as the current collector, the current collector is covered with an alumina ($Al_2O_3$) thin film or an aluminum fluoride ($AlF_3$) thin film. This technology may bring about some effects when charged and discharged under a low voltage (for example, at about 4.3 V).

However, when charged and discharged at the aforementioned high temperature under the aforementioned high voltage, this technology could not sufficiently suppress the elution of the metal ions.

SUMMARY

Embodiments are directed to a positive electrode for a non-aqueous electrolyte secondary battery, the positive electrode including a positive current collector, a coating layer including graphite, the coating layer coating the positive current collector, a positive active material having a composition represented by Chemical Formula 1, and a conductive auxiliary agent having a BET specific surface area of about 35 $m^2$/g to about 350 $m^2$/g:

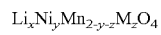
[Chemical Formula 1]

$$Li_xNi_yMn_{2-y-z}M_zO_4$$

wherein, M is at least one metal element selected from a transition metal, aluminum, magnesium, gallium, indium, and lanthanum, the transition metal is a transition metal other than nickel (Ni) or manganese (Mn), and x, y, and z are within the ranges: $0.02 \leq x \leq 1.10$, $0.25 \leq y \leq 0.6$, and $0.0 \leq z \leq 0.10$.

In Chemical Formula 1, M may be at least one metal selected from aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

In Chemical Formula 1, y may be within the range of $0.40 \leq y \leq 0.60$.

The BET specific surface area of the conductive auxiliary agent may range from about 45 $m^2$/g to about 350 $m^2$/g.

The BET specific surface area of the conductive auxiliary agent may range from about 100 $m^2$/g to about 300 $m^2$/g.

The BET specific surface area of the conductive auxiliary agent may range from about 120 $m^2$/g to about 220 $m^2$/g.

The conductive auxiliary agent may include carbon black.

Embodiments are also directed to a non-aqueous electrolyte secondary battery including the positive electrode as described above, a negative electrode, and an electrolyte including a non-aqueous solvent and a lithium salt.

The non-aqueous solvent may include at least one fluoro-based non-aqueous solvent.

BRIEF DESCRIPTION OF THE DRAWING

Features will become apparent to those of skill in the art by describing in detail exemplary embodiments with reference to the attached drawing in which:

FIG. 1 illustrates a view showing a schematic structure of a non-aqueous electrolyte secondary battery according to an embodiment.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing FIGURE, the dimensions of layers and regions may be exaggerated for clarity of illustration.

A positive electrode for a rechargeable lithium battery according to an embodiment includes a positive current collector, a coating layer including graphite and coating the positive current collector, a positive active material having a composition represented by Chemical Formula 1, and a conductive auxiliary agent having a BET specific surface area of about 35 m²/g to about 350 m²/g.

$$Li_xNi_yMn_{2-y-z}M_zO_4 \quad \text{[Chemical Formula 1]}$$

In Chemical Formula 1, M is at least one metal element selected from a transition metal, aluminum, magnesium, gallium, indium, and lanthanum, the transition metal is a transition metal other than nickel (Ni) and manganese (Mn), and x, y, and z are within the ranges of $0.02 \leq x \leq 1.10$, $0.25 \leq y \leq 0.6$, and $0.0 \leq z \leq 0.10$.

The positive active material represented by Chemical Formula 1 may have a spinel-type crystal structure. When a non-aqueous electrolyte secondary battery is manufactured using the positive electrode, a non-aqueous electrolyte secondary battery may be charged and discharged at a high voltage. For example, the upper limit of a cut-off voltage of charging may be set to be greater than or equal to about 4.5 V.

In Chemical Formula 1, M may be one metal or two or more metals selected from aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

In Chemical Formula 1, y may be within the range of $0.40 \leq y < 0.60$. By such a structure, cycle-life characteristics may be improved when a non-aqueous electrolyte secondary battery is charged and discharged under a high temperature and a high voltage.

In addition, when the positive current collector is covered by the coating layer including graphite, elution of metal ions from the positive current collector may be suppressed when a non-aqueous electrolyte secondary battery is charged and discharged under a high temperature and a high voltage. Therefore, a cycle-life characteristics of the non-aqueous electrolyte secondary battery may be improved.

The BET specific surface area of the conductive auxiliary agent may range from about 35 m²/g to about 350 m²/g, or, for example, about 45 m²/g to about 350 m²/g, or, for example, about 100 m²/g to about 300 m²/g, or, for example, about 120 m²/g to about 220 m²/g. If the BET specific surface area of the conductive auxiliary agent is within the ranges, improved cycle-life characteristics may be realized when a non-aqueous electrolyte secondary battery including the positive electrode is charged and discharged under a high temperature and a high voltage.

The conductive auxiliary agent may include carbon black. When the conductive auxiliary agent includes carbon black, improved cycle-life characteristics may be realized when a non-aqueous electrolyte secondary battery including the positive electrode is charged and discharged under a high temperature and a high voltage.

According to another aspect, a non-aqueous electrolyte secondary battery including the positive electrode for a non-aqueous electrolyte secondary battery is provided.

According to this aspect, a cycle-life characteristics may be improved when a non-aqueous electrolyte secondary battery is charged and discharged at a high temperature and at a high voltage.

As a solvent of an electrolyte solution, at least one fluoro-based non-aqueous solvent may be included. When a non-aqueous electrolyte secondary battery is charged and discharged under a high temperature and a high voltage, cycle-life characteristics may be improved.

Hereinafter, referring to FIG. 1, a detailed structure of the non-aqueous electrolyte secondary battery 10 according to an embodiment.

FIG. 1 illustrates a schematic view for explaining a structure of a non-aqueous electrolyte secondary battery according to an embodiment.

As shown in FIG. 1, a non-aqueous electrolyte secondary battery 10 may include a positive electrode 20, a negative electrode 30, a separator 40, and an electrolyte solution.

The non-aqueous electrolyte secondary battery 10 may have a suitable shape. For example, the non-aqueous electrolyte secondary battery 10 may be cylindrical, prismatic, laminate-type, button type, or the like.

The positive electrode 20 may include a positive current collector 21, a coating layer 21a, and a positive active material layer 22.

The positive current collector 21 may include, for example aluminum, or the like.

The coating layer 21a may be formed on at least one surface of the positive current collector 21 and may cover at least one surface of the positive current collector 21. In some implementations, the coating layer 21a may be disposed at the interface of the positive current collector 21 and the positive active material layer 22.

When the positive active material layer 22 is disposed on both sides of the positive current collector 21 (for example, when the non-aqueous electrolyte secondary battery 10 is a spiral secondary battery), the coating layer 21a may be appropriately disposed on both sides of the positive current collector 21. When the coating layer 21a is positioned on both sides of the positive current collector 21, the elution of the metal ions from the positive current collector 21 may be more certainly suppressed.

The coating layer 21a may include graphite. When the positive current collector 21 is covered by the graphite, elution of metal ions from the positive current collector 21 may be suppressed by the graphite, and cycle-life characteristics may be remarkably improved.

The type of graphite usable for the coating layer has no particular limit. Examples of the graphite may include natural graphite, artificial graphite, or flake-type graphite or the like obtained by not grinding but chipping the natural graphite or the artificial graphite to a degree of peeling off layers having a weak bond. The graphite may have a smaller specific surface area than other conductive materials such as carbon black or the like and may maintain a sufficient slurry state as a coating material. Accordingly, the graphite may realize satisfactory coating property on a current collector without a defect.

The coating layer 21a may further include other components, for example, a suitable binder, such as a binder that is used in the positive active material layer 22.

A thickness of the coating layer 21a is not particularly limited, and may be for example, about 0.5 μm to about 2 μm. When the coating layer 21a has a thickness in a range of about 0.5 μm to about 2 μm, the coating layer 21a may sufficiently lower resistance and play a role of protecting the positive current collector 21 from a high charge voltage.

In addition, the graphite may have surface density in a range of about 0.05 mg/cm² to about 0.3 mg/cm², as an example.

The coating layer 21a may be formed, for example, by dispersing a material for the coating layer 21a in ion exchange water to form slurry and then, coating the slurry on the positive current collector 21 and drying the coated slurry.

If the positive active material layer 22 were to be formed on the coating layer by coating the slurry dispersed in an organic solvent, the coating layer could peel off when the organic solvent contacts the dried coating layer. Accordingly, it is desirable to form the coating layer dispersion in the ion exchange water.

The positive active material layer 22 may include at least one of positive active material and the conductive auxiliary agent, and may further include a binder.

The positive active material may have a composition represented by Chemical Formula 1 and a spinel-type crystal structure.

$$Li_xNi_yMn_{2-y-z}M_zO_4 \quad \text{[Chemical Formula 1]}$$

In Chemical Formula 1, M is at least one metal element selected from a particular transition metal and aluminum. The particular transition metal is a transition metal other than nickel or manganese. The variables x, y, and z may be within the following ranges: $0.02 \le x \le 1.10$, $0.25 \le y \le 0.6$, and $0.0 \le z \le 0.10$.

In Chemical Formula 1, M may be one metal, or two or more metals selected from aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

According to an embodiment, in Chemical Formula 1, y may be within the ranges $0.40 \le y < 0.60$ and z is 0.

The positive active material represented by Chemical Formula 1 may have a spinel-type crystal structure. Accordingly, a non-aqueous electrolyte secondary battery 10 including such a positive active material may be charged and discharged at a high voltage. For example, an upper limit of a cut-off voltage at charge may be greater than or equal to about 4.5 V. For example, the cut-off voltage at charge may be about 4.9 V.

When a general non-aqueous electrolyte secondary battery is charged and discharged under a high temperature and a high voltage, metal ions may be eluted from the positive current collector. However, in the non-aqueous electrolyte secondary battery 10 according to embodiments, the positive current collector 21 may be covered by the coating layer 21a, and thus, elution of metal ions may be suppressed.

The amount of the positive active material may be a suitable amount that is applied to a positive active material layer of a general non-aqueous electrolyte secondary battery.

The BET specific surface area of the conductive auxiliary agent may range from about 35 m²/g to about 350 m²/g. For example, the BET specific surface area may range from about 45 m²/g to about 350 m²/g, or, for example, about 100 m²/g to about 300 m²/g, or, for example, about 120 m²/g to about 220 m²/g.

When the BET specific surface area of the conductive auxiliary agent is within the ranges, cycle-life characteristics may further improved.

The positive active material having the spinel-type crystal structure may have low powder resistivity at room temperature (for example, about $10^{-6}$ Ωcm to about $10^{-7}$ Ωcm). Accordingly, conductivity of the positive active material layer 22 may be increased by using the conductive auxiliary agent.

In an embodiment, the conductive auxiliary agent having a BET specific surface area within the range may increase the conductivity of the positive active material layer 22 and improve cycle-life characteristics of the non-aqueous electrolyte secondary battery 10 including the positive active material layer 22.

The BET specific surface area may be measured by, for example, using a high definition multi-detection gas adsorption measuring device (Autosorb available from Quantachrome Instruments).

The amount of the conductive auxiliary agent may be a suitable amount applicable to a positive active material layer of a non-aqueous electrolyte secondary battery.

The conductive auxiliary agent may be, for example, carbon black such as at least one of ketjen black, acetylene black, furnace black, or the like. For example, the conductive auxiliary agent may be acetylene black.

When a non-aqueous electrolyte secondary battery is charged and discharged under a high voltage, there is a possibility that a defect portion of carbon black could react with an electrolyte solution, thereby generating gas and thus causing an expansion of the non-aqueous electrolyte secondary battery. Acetylene black has the fewest carbon black defects and thus may be appropriately used as the carbon black in the non-aqueous electrolyte secondary battery 10.

The binder may be a suitable binder capable of binding the positive active material and the conductive auxiliary agent onto the positive current collector 21. For example, the binder may be polyvinylidene difluoride, an ethylenepropylene diene terpolymer, a styrene butadiene rubber, an acrylonitrile butadiene rubber, a fluoroelastomer, polyvinyl acetate, polymethyl methacrylate, polyethylene, nitrocellulose, or the like. A amount of the binder may be a suitable amount applicable to a positive active material layer of a non-aqueous electrolyte secondary battery.

The positive active material layer 22 may be formed by, for example, dispersing a positive active material, a conductive auxiliary agent, and a binder in an appropriate organic solvent (for example, N-methyl-2-pyrrolidone) to prepare a slurry, coating the slurry onto the coating layer 21a, and drying and compressing the same.

The negative electrode 30 may include a negative current collector 31 and a negative active material layer 32.

The negative current collector 31 may include, for example, copper, nickel, or the like.

The negative active material layer 32 may be any negative active material layer of a non-aqueous electrolyte secondary battery. For example, the negative active material layer 32 may include a negative active material and may further include a binder.

The negative active material may include, for example, a graphite active material (artificial graphite, natural graphite, a mixture of artificial graphite and natural graphite, natural graphite coated artificial graphite, etc.), silicon (Si) or tin (Sn) or a mixture of oxides particulate thereof and a graphite active material, a silicon or tin particulate, an alloy including silicon or tin as a basic material, $Li_4Ti_5O_{12}$, a titanium oxide ($TiO_x$)-based compound, or the like. The oxide of silicon may be an oxide represented by $SiO_x$ ($0 \le x \le 2$).

In addition, the negative active material may include, for example metal lithium, or the like in addition to the above materials.

The binder may be, for example, a styrene butadiene rubber (SBR), or the like. A weight ratio of the negative active material and the binder may be a suitable weight ratio adopted in a general non-aqueous electrolyte secondary battery.

The separator 40 may be a suitable separator used in a non-aqueous electrolyte secondary battery.

For example, the separator may include a porous layer or a non-woven fabric having excellent high-rate discharge performance. The porous layer or non-woven fabric may be used alone or in a mixture thereof.

The separator may be made of a material such as, for example, a polyolefin-based resin such as polyethylene, polypropylene, or the like, a polyester-based resin such as polyethylene terephthalate, polybutylene terephthalate, or the like, polyvinylidene difluoride, a vinylidene fluoride-hexafluoro propylene copolymer, a vinylidene fluoride-perfluorovinylether copolymer, a vinylidene fluoride-tetrafluoroethylene copolymer, a vinylidene fluoride-trifluoroethylene copolymer, a vinylidene fluoride-fluoroethylene copolymer, a vinylidene fluoride-hexafluoro acetone copolymer, a vinylidene fluoride-ethylene copolymer, a vinylidene fluoride-propylene copolymer, a vinylidene fluoride-trifluoro propylene copolymer, a vinylidene fluoride-tetrafluoroethylene-hexafluoro propylene copolymer, a vinylidene fluoride-ethylene-tetrafluoroethylene copolymer, or the like.

The porosity of the separator may be a suitable porosity of a separator of a non-aqueous electrolyte secondary battery.

The separator may include a coating layer including an inorganic filler. For example, the coating layer may include at least one of $Mg(OH)_2$ or $Al_2O_3$ as the inorganic filler.

According to this structure, the coating layer including the inorganic filler may prevent oxidization and decomposition of the electrolyte solution on the surface of the positive electrode when stored at a high temperature and may suppress the generation of gas as a decomposition product of the electrolyte solution in order to prevent direct contact of the positive electrode with a separator.

The coating layer including the inorganic filler may be formed on both sides of the separator or either one of sides of the separator facing the positive electrode.

When the Coating layer including the inorganic filler is formed at least one surface facing the positive electrode, direct contact of the positive electrode with the electrolyte solution may be prevented.

In some implementations, the coating layer including the inorganic filler may be formed on the positive electrode instead of on the separator. The coating layer including the inorganic filler may be formed on both sides of the positive electrode, Thus, direct contact of the positive electrode with the separator may be prevented.

In some implementations, the coating layer including the inorganic filler may be formed on the positive electrode and both sides of the separator.

The electrolyte solution may include suitable non-aqueous solvents used in a lithium ion secondary battery. The non-aqueous solvent may include at least one of a fluoro-based non-aqueous solvent of hydrofluoroether (HFE) and fluorocarbonate (fluoroethylene carbonate, etc.).

The solvent may also include a linear carbonate ester.

The hydrofluoroether, wherein a part of hydrogen of ether is substituted by fluorine, may have improved oxidation resistance. The hydrofluoroether (HFE) may be, for example, 2,2,2-trifluoroethylmethylether ($CF_3CH_2OCH_3$), 2,2,2-trifluoroethyl difluoromethylether ($CF_3CH_2OCHF_2$), 2,2,3,3,3-pentafluoropropylmethylether ($CF_3CF_2CH_2OCH_3$), 2,2,3,3,3-pentafluoropropyldifluoromethyl ether ($CF_3CF_2CH_2OCHF_2$), 2,2,3,3,3-penta fluoropropyl-1,1,2,2-tetrafluoroethyl ether ($CF_3CF_2CH_2OCF_2CF_2H$), 1,1,2,2-tetrafluoro ethylmethylether ($HCF_2CF_2OCH_3$), 1,1,2,2-tetrafluoro ethylethylether ($HCF_2CF_2OCH_2CH_3$), 1,1,2,2-tetrafluoroethylpropylether ($HCF_2CF_2OC_3H_7$), 1,1,2,2-tetrafluoro ethylbutylether ($HCF_2CF_2OC_4H_9$), 1,1,2,2-tetrafluoroethylisobutylether ($HCF_2CF_2OCH_2CH(CH_3)_2$), 1,1,2,2-tetrafluoro ethylneopentylether ($HCF_2CF_2OCH_2C(CH_3)_3$), 1,1,2,2-tetrafluoroethyl-2,2,2-trifluoro ethylether ($HCF_2CF_2OCH_2CF_3$), 1,1,2,2-tetrafluoroethyl-2,2,3,3,3-tetrafluoro propylether ($HCF_2CF_2OCH_2CF_2CF_2H$), hexafluoro isopropylmethylether (($CF_3)_2CHOCH_3$), 1,1,3,3,3-pentafluoro-2-trifluoro methylpropylmethylether (($CF_3)_2CHCF_2OCH_3$), 1,1,2,3,3,3-hexafluoro propylmethylether ($CF_3CHFCF_2OCH_3$), 1,1,2,3,3,3-hexafluoro propylethylether ($CF_3CHFCF_2OCH_2CH_3$), and 2,2,3,4,4,4-hexafluoro butyldifluoromethylether ($CF_3CHFCF_2CH_2OCHF_2$), considering a charge voltage and resistance for a current density of a positive active material.

The electrolytic salt may be, for example, an inorganic ion salt including lithium (Li), sodium (Na) or potassium (K). Examples of the electrolytic salt includ $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, KSCN, or the like, or an organic ion salt such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfate, lithium octyl sulfate, lithium dodecylbenzene sulfonate. These ionic compounds may be used alone or in a mixture of two or more.

The concentration of the electrolytic salt may be the same as that of a non-aqueous electrolyte used in a general rechargeable lithium battery.

In an embodiment, an electrolyte solution including an appropriate lithium compound (electrolytic salt) at a concentration of about 0.5 mol/L to about 2.0 mol/L may be used.

Hereinafter, a method of manufacturing the non-aqueous electrolyte secondary battery according to an example embodiment is illustrated. The method illustrated as follows is only one example, and it is to be understood that the non-aqueous electrolyte secondary battery 10 may be manufactured in other methods.

First, a method of preparing a positive active material is described.

A method of preparing a positive active material may include, for example, a co-precipitation method. Hereinafter, one example of a method of preparing a positive active material using such a co-precipitation method is described.

First, nickel sulfate 6 hydrate ($NiSO_4.6H_2O$), manganese sulfate 5 hydrate ($MnSO_4.5H_2O$), and a compound including a metal element M is dissolved in ion exchange-treated water to prepare a mixed aqueous solution.

A total weight of nickel sulfate 6 hydrate, manganese sulfate 5 hydrate, and the compound including a metal element M may be, for example, about 20 wt % based on the entire weight of the mixed aqueous solution.

Nickel sulfate 6 hydrate, manganese sulfate 5 hydrate, and the compound including a metal element M may include Ni, Mn, and M in a desired mol ratio.

The mol ratio of each element may be determined depending on an intended composition of a prepared positive active material. For example, $LiNi_{0.5}Mn_{1.45}Al_{0.05}O_4$ may be prepared in a mol ratio of 50:145:5 of Ni:Mn:Al.

The metal element M may be one metal, or two or more of metals selected from aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

The compound including the metal element M may be, for example, salts such as sulfate, nitrate, or the like of the metal element M, an oxide or a hydroxide thereof, or the like.

Subsequently, the mixed aqueous solution may be added in a dropwise fashion to a reaction layer ion exchange water obtained by bubbling a predetermined amount (for example, 500 ml) of ion exchange water maintained at 50° C. with inert gas such as nitrogen or the like.

An excessive amount of a $Na_2CO_3$-saturated aqueous solution based on the amount of the Ni, Mn, and M of the mixed aqueous solution may be added in a dropwise fashion to the resulting mixture. A reaction layer aqueous solution may be obtained at a pH of 11.5 at 50° C. during the dropwise addition of the $NaCO_3$-saturated aqueous solution.

The addition speed in a dropwise fashion may be, for example, about 3 ml/min. If the addition of the mixed aqueous solution and the $Na_2CO_3$-saturated aqueous solution in a dropwise fashion is performed too fast, a uniform precursor (co-precipitated hydroxide salt) might not be obtained.

The addition process of the mixed aqueous solution and the $Na_2CO_3$-saturated aqueous solution in a dropwise fashion may be performed for predetermined time, for example, for about 10 hours. During this process, a hydroxide of each metal element may be co-precipitated to obtain co-precipitation products.

Subsequently, the co-precipitation products may be solid-liquid separated (for example, suction-filtered) to separate the co-precipitation hydroxides from the reaction layer aqueous solution. The separated co-precipitation hydroxides may be washed with ion exchange water.

The obtained co-precipitation hydroxides may be vacuum-dried. The vacuum drying may be performed, for example, at about 100° C. for 10 hours.

Subsequently, the dried co-precipitation hydroxides may be ground with a mortar to obtain dry powder.

The dry powder may be mixed with lithium carbonate ($Li_2CO_3$) to obtain a mixed powder. Herein, a mol ratio between Li and Ni+Mn+M (herein, Ni+Mn+M=Me) may be determined depending on a composition of a positive active material. For example, $LiNi_{0.5}Mn_{1.45}Al_{0.05}O_4$ may be prepared in a mol ratio of Li:Me of 1.0:2.0. The mixed powder may be fired. The firing process may be performed under an air atmosphere. The time and temperature for the firing may be discretionally determined. For example, the temperature may be in a range of 900° C. to 1100° C., and the time may be about 6 hours.

Through the aforementioned processes, a positive active material may be prepared.

A positive electrode 20 may be manufactured as follows.

First, a coating layer 21a may be formed on a positive current collector 21. The coating layer 21a may be formed, for example, by weighing the aforementioned natural graphite, styrene butadiene rubber (SBR) as a binder, and carboxymethyl cellulose in a desired weight ratio (for example, 1:1:1) and dispersing the natural graphite, styrene butadiene rubber (SBR) as a binder, carboxymethyl cellulose in ion exchange water to prepare a slurry.

Subsequently, the slurry may be coated onto the positive current collector 21 and dried to form the coating layer 21a on the positive current collector 21.

The coating may be performed, for example, by knife coating, gravure coating, or the like. Each following coating process may be performed in the same method as above.

Subsequently, materials to make up a positive active material layer 22 (for example, a positive active material, a conductive auxiliary agent, and a binder) may be dispersed in an organic solvent (for example, N-methyl-2-pyrrolidone) to obtain a slurry.

The slurry may be coated on the coating layer 21a and dried to form the positive active material layer 22. The positive active material layer 22 may be compressed with a compressor until the positive active material 22 has a desired thickness to manufacture the positive electrode 20.

Herein, a thickness of the positive active material layer 22 may be a suitable thickness of a positive active material layer of a non-aqueous electrolyte secondary battery. Coating of the positive active material may be performed in a dry environment.

A negative electrode 30 may be manufactured by mixing a negative active material, carboxymethyl cellulose (CMC), and a conductive auxiliary agent in a desired ratio and then, adding a small amount of ion exchange water thereto and mixing the negative active material, carboxymethyl cellulose (CMC), and a conductive auxiliary agent.

Subsequently, ion exchange water may be added to the mixture to adjust the viscosity of the mixture, and a styrene butadiene rubber (SBR) binder may be added thereto to prepare a negative electrode slurry.

The negative electrode slurry may be coated onto a negative current collector 31 and dried to form a negative active material layer 32. The negative active material layer 32 may be compressed with a compressor to a desired thickness to manufacture the negative electrode 30. The negative active material layer 32 may have a suitable thickness for a negative active material layer of a non-aqueous electrolyte secondary battery.

In addition, when metal lithium is used for the negative active material layer 32, a metal lithium film may be overlapped on the negative current collector 31.

Subsequently, a separator 40 may be disposed between the positive electrode 20 and the negative electrode 30 to manufacture an electrode structure.

The electrode structure may be shaped into a desired shape (for example, a cylinder, a prism, a laminate shape, a button shape, and the like) and inserted into a container having a shape corresponding to the electrode structure.

An electrolyte solution having a desired composition may be injected into the container to impregnate each pore in the separator. Through this process, the non-aqueous electrolyte secondary battery 10 may be manufactured.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Hereinafter, Examples according to the embodiments are disclosed.

Example 1

Preparation of Positive Active Material

First, nickel sulfate 6 hydrate ($NiSO_4.6H_2O$) and manganese sulfate 5 hydrate ($MnSO_4.5H_2O$) were dissolved in ion exchange water to prepare a mixed aqueous solution. A total weight of the nickel sulfate 6 hydrate and the manganese sulfate 5 hydrate was about 20 wt % based on the entire weight of the mixed aqueous solution. A mole ratio of each element was Ni:Mn=5:15.

Subsequently, the mixed aqueous solution was added in a dropwise fashion to a reaction layer ion exchange water obtained by bubbling a predetermined amount (for example, 500 ml) of ion exchange water maintained at 50° C. with nitrogen gas to remove oxygen dissolved therein.

An excessive amount of a $Na_2CO_3$-saturated aqueous solution based on the amounts of Ni and Mn in the mixed aqueous solution was added to the obtained mixture to prepare a reaction layer aqueous solution. During the addition, the reaction layer aqueous solution was maintained at pH of 11.5 and a temperature of 50° C. The addition of the mixed aqueous solution and the $NaCO_3$-saturated aqueous solution was performed at about 3 ml/min for 10 hours. During this process, a hydroxide salt of each metal element was co-precipitated.

Subsequently, each co-precipitate was solid-liquid separated (for example, suction-filtered) to separate the co-precipitated hydroxide salt from the reaction layer aqueous solution, and the co-precipitated hydroxide salt was cleaned with ion exchange water. The cleaned hydroxide salt co-precipitate was vacuum-dried. The drying was performed at about 100° C. for about 10 hours.

Subsequently, the dried hydroxide salt co-precipitate was ground with a mortar for several minutes to obtain dry powder. The obtained dry powder was mixed with lithium carbonate ($Li_2CO_3$) to obtain mixed powder. A mol ratio of Li to Ni+Mn (Li:Me, where Me is Ni+Mn) was 1.0:2.0.

The mixed powder was fired under an atmosphere. The firing was performed in a range of 900° C. to 1100° C. for about 6 hours.

Through this aforementioned process, a positive active material was prepared. The positive active material according to Example 1 had a composition of $LiNi_{0.05}Mn_{1.5}O_4$.

An average particle diameter of the positive active material (an arithmetic average of every spherical particle diameter) was interpreted through a SEM image. For example, every diameter of a plurality of spherical particles of the positive active material was obtained through the SEM image and averaged to obtain the average particle diameter. As a result, the average particle diameter was 7 μm.

Manufacture of Coin-Type Half-Cell

Through the following process, a coin-type half-cell was manufactured.

First, natural graphite (Nippon Graphite industry Co., Ltd.), styrene butadiene rubber (SBR), and CMC were weighed in a weight ratio of 1:1:1 and dispersed in ion exchange water to form a slurry.

Subsequently, the slurry was coated onto an aluminum thin film of a positive current collector 21 and dried to form a coating layer 21a thereon. The concentration and coating amount of the natural graphite in the slurry were adjusted such that the natural graphite in the coating layer 21a would have surface density of 0.07 mg/cm². The coating layer 21a had a thickness of 0.5 μm.

Subsequently, the positive active material, acetylene black having a BET specific surface area of 133 m²/g (Denka Company Limited), and polyvinylidene fluoride were mixed in a weight ratio of 95:2:3. The BET specific surface area was measured by using a high definition•multi-detection gas adsorption measuring device (Autosorb available from Quantachrome Instruments).

The mixture (positive electrode mass) was dispersed in N-methyl-2-pyrrolidone to form a slurry. The slurry was coated onto the coating layer 21a and dried to form a positive active material layer 22. Then, the positive active material layer 22 was compressed to have a thickness of 50 μm and thus manufacture a positive electrode 20.

A negative electrode 30 was manufactured by disposing a metal lithium thin film on a copper foil, the copper foil being a negative current collector 31.

Then, a 12 μm-thick porous polypropylene film (coated with magnesium hydroxide on both sides, Teijin Limited.) was used as a separator and interposed between the positive electrode 20 and the negative electrode 30 to manufacture an electrode structure. The electrode structure was processed to have the size of a coin-type half-cell and was housed in a container for a coin-type half-cell.

Subsequently, an electrolyte solution was prepared by mixing fluoroethylene carbonate (FEC), dimethyl carbonate (DMC), and hydro fluoroether (HFE) in a volume ratio of 2:3:5 to prepare a non-aqueous solvent and dissolving lithium hexafluoro phosphate ($LiPF_6$) in a concentration of 1.15 M in the non-aqueous solvent. The resultant was injected into the container to manufacture a coin-type half-cell.

Charging and Discharging

The coin-type half-cell was charged and discharged at a charge and discharge rate shown in Table 1. CC-CV indicates a constant current-constant voltage, and CC indicates a constant current. The charge and discharge was performed at a temperature of 45° C. A cut-off voltage was in a range of 3.0 V to 4.9 V ($Li/Li^+$).

The charge at the $63^{rd}$ cycle was cut off at $\frac{1}{20}$ C.

TABLE 1

| Test cycle | Charge rate | Discharge rate |
|---|---|---|
| 1 | 0.1 C CC | 0.1 C CC |
| 2 | 0.2 C CC | 0.2 C CC |
| 3 | 0.2 C CC | 0.5 C CC |
| 4 | 0.2 C CC | 1 C CC |
| 5 | 0.2 C CC | 2 C CC |
| 6 | 0.2 C CC | 5 C CC |
| 7 | 0.2 C CC | 0.2 C CC |
| 8 | 0.5 C CC | 0.2 C CC |
| 9 | 1 C CC | 0.2 C CC |
| 10 | 2 C CC | 0.2 C CC |
| 11 | 5 C CC | 0.2 C CC |
| 12-13 | 0.2 C CC | 0.2 C CC |
| 14-62 | 1 C CC | 1 C CC |
| 63 | 1 C CC-CV | 1 C CC |
| 64-65 | 0.2 C CC | 0.2 C CC |

Herein, the discharge capacity at the $2^{nd}$ cycle was regarded as discharge capacity of the embodiment of Example 1. The discharge capacity at the $6^{th}$ cycle was divided by discharge capacity at the $3^{rd}$ cycle (5 C/0.5 C) to obtain discharge load characteristics. The charge capacity at the $11^{th}$ cycle was divided by charge capacity at the $8^{th}$ cycle (5 C/0.5 C) to obtain charge load characteristics. The discharge capacity at the $63^{th}$ cycle was divided by discharge capacity at the $14^{th}$ cycle to obtain a cycle-life (capacity retention). The results are shown in Table 2.

TABLE 2

| | Compositions of positive active material | Average particle diameter of positive active material (μm) | Inclusion of coating layer | BET of conductive auxiliary agent (m²/g) | Discharge capacity (mAh/g) | Discharge load characteristics (%) | Charge load characteristics (%) | Cycle-life (%) |
|---|---|---|---|---|---|---|---|---|
| Example 1 | $LiNi_{0.5}Mn_{1.5}O_4$ | 7 | Yes | 133 | 138 | 95 | 85 | 96 |
| Example 2 | $Li_{1.03}Ni_{0.5}Mn_{1.5}O_4$ | 7 | Yes | 125 | 138 | 94 | 84 | 95 |
| Example 3 | $Li_{1.03}Ni_{0.5}Mn_{1.5}O_4$ | 7 | Yes | 39 | 138 | 95 | 81 | 93 |
| Example 4 | $Li_{1.03}Ni_{0.5}Mn_{1.45}Al_{0.05}O_4$ | 7 | Yes | 125 | 132 | 94 | 85 | 96 |
| Example 5 | $Li_{1.03}Ni_{0.5}Mn_{1.49}Al_{0.01}O_4$ | 7 | Yes | 125 | 135 | 95 | 85 | 95 |
| Example 6 | $Li_{1.03}Ni_{0.5}Mn_{1.49}Cu_{0.01}O_4$ | 7 | Yes | 125 | 135 | 94 | 84 | 98 |
| Example 7 | $Li_{1.03}Ni_{0.5}Mn_{1.48}Zn_{0.02}O_4$ | 7 | Yes | 125 | 135 | 94 | 85 | 98 |
| Example 8 | $Li_{1.03}Ni_{0.5}Mn_{1.49}Zn_{0.01}O_4$ | 7 | Yes | 125 | 135 | 94 | 84 | 97 |
| Example 9 | $Li_{1.03}Ni_{0.5}Mn_{1.5}O_4$ | 7 | Yes | 206 | 138 | 95 | 85 | 96 |
| Example 10 | $Li_{1.03}Ni_{0.5}Mn_{1.5}O_4$ | 7 | Yes | 215 | 138 | 95 | 85 | 96 |
| Comparative Example 1 | $Li_{1.03}Ni_{0.5}Mn_{1.5}O_4$ | 7 | No | 133 | 138 | 95 | 85 | Sharp degradation |
| Comparative Example 2 | $Li_{1.03}Ni_{0.5}Mn_{1.5}O_4$ | 7 | No | 125 | 138 | 94 | 84 | Sharp degradation |
| Comparative Example 3 | $Li_{1.03}Ni_{0.5}Mn_{1.45}Al_{0.05}O_4$ | 7 | No | 125 | 132 | 94 | 85 | Sharp degradation |
| Comparative Example 4 | $Li_{1.03}Ni_{0.5}Mn_{1.45}Cu_{0.01}O_4$ | 7 | No | 125 | 135 | 94 | 84 | Sharp degradation |
| Comparative Example 5 | $Li_{1.03}Ni_{0.5}Mn_{1.49}Zn_{0.02}O_4$ | 7 | No | 125 | 135 | 94 | 85 | Sharp degradation |
| Comparative Example 6 | $Li_{1.03}Ni_{0.5}Mn_{1.49}Zn_{0.01}O_4$ | 7 | No | 125 | 135 | 94 | 84 | Sharp degradation |
| Comparative Example 7 | $Li_{1.03}Ni_{0.5}Mn_{1.5}O_4$ | 7 | Yes | 377 | 138 | 95 | 85 | 80 |
| Comparative Example 8 | $Li_{1.03}Ni_{0.5}Mn_{1.5}O_4$ | 7 | Yes | 800 | 138 | 95 | 85 | 76 |
| Comparative Example 9 | $Li_{1.03}Co_{0.98}Al_{0.01}Mg_{0.01}O_2$ | 13 | Yes | 125 | 224 | 90 | 88 | 68 |
| Comparative Example 10 | $Li_{1.03}Co_{0.98}Al_{0.01}Mg_{0.01}O_2$ | 13 | No | 125 | 224 | 90 | 88 | 68 |
| Comparative Example 11 | $0.4Li_2MnO_3$—$0.6Li(Ni_{0.33}Co_{0.33}Mn_{0.33})O_2$ | 7 | Yes | 125 | 242 | 77 | 75 | 89 |
| Comparative Example 12 | $0.4Li_2MnO_3$—$0.6Li(Ni_{0.33}Co_{0.33}Mn_{0.33})O_2$ | 7 | No | 125 | 242 | 77 | 75 | 89 |

Example 2

A coin-type half-cell was manufactured according to the same method as Example 1 except for using acetylene black having a BET specific surface area of 125 m²/g (Denka Company Limited) as a conductive auxiliary agent. The results are shown in Table 2.

Example 3

A coin-type half-cell was manufactured according to the same method as Example 1 except for using acetylene black having a BET specific surface area of 39 m²/g (Denka Company Limited) as a conductive auxiliary agent. The results are shown in Table 2.

Example 4

A positive active material represented by $Li_{1.03}Ni_{0.5}Mn_{1.45}Al_{0.05}O_4$ was prepared according to the same method as Example 1 except for further using $Al_2(SO_4)_3.16H_2O$ in addition to nickel sulfate 6 hydrate ($NiSO_4.6H_2O$) and manganese sulfate 5 hydrate ($MnSO_4.5H_2O$). A coin-type half-cell was manufactured according to the same method as Example 1 except for using acetylene black having a BET specific surface area of 125 m²/g (Denka Company Limited) as a conductive auxiliary agent. The results are shown in Table 2.

Example 5

A positive active material represented by $Li_{1.03}Ni_{0.5}Mn_{1.49}Al_{0.01}O_4$ was prepared according to the same method as Example 1 except for further using aluminum sulfate 16 hydrate ($Al_2(SO_4)_3.16H_2O$) in addition to nickel sulfate 6 hydrate ($NiSO_4.6H_2O$) and manganese sulfate 5 hydrate ($MnSO_4.5H_2O$). A coin-type half-cell was manufactured according to the same method as Example 1 except for using acetylene black having a BET specific surface area of 125 m²/g (Denka Company Limited) as a conductive auxiliary agent. The results are shown in Table 2.

Example 6

A positive active material represented by $Li_{1.03}Ni_{0.5}Mn_{1.49}Cu_{0.01}O_4$ was prepared according to the same method as Example 1 except for further using copper sulfate 5 hydrate ($CuSO_4.5H_2O$) in addition to nickel sulfate 6 hydrate ($NiSO_4.6H_2O$) and manganese sulfate 5 hydrate ($MnSO_4.5H_2O$). A coin-type half-cell was manufactured according to the same method as Example 1 except for using acetylene black having a BET specific surface area of 125 m²/g (Denka Company Limited) as a conductive auxiliary agent. The results are shown in Table 2.

Example 7

A positive active material represented by $Li_{1.03}Ni_{0.5}Mn_{1.48}Zn_{0.02}O_4$ was prepared according to the same method as Example 1 except for further using zinc sulfate 7 hydrate ($ZnSO_4.7H_2O$) in addition to nickel sulfate 6 hydrate ($NiSO_4.6H_2O$) and manganese sulfate 5 hydrate ($MnSO_4.5H_2O$). A coin-type half-cell was manufactured according to the same method as Example 1 except for using acetylene black having a BET specific surface area of 125 m²/g (Denka Company Limited) as a conductive auxiliary agent. The results are shown in Table 2.

Example 8

A positive active material represented by $Li_{1.03}Ni_{0.5}Mn_{1.49}Zn_{0.01}O_4$ was prepared according to the same method as Example 1 except for further using zinc sulfate 7 hydrate ($ZnSO_4 \cdot 7H_2O$) in addition to nickel sulfate 6 hydrate ($NiSO_4 \cdot 6H_2O$) and manganese sulfate 5 hydrate ($MnSO_4 \cdot 5H_2O$). A coin-type half-cell was manufactured according to the same method as Example 1 except for using acetylene black having a BET specific surface area of 125 m²/g (Denka Company Limited) as a conductive auxiliary agent. The results are shown in Table 2.

Example 9

A coin-type half-cell was manufactured according to the same method as Example 1 except for using acetylene black having a BET specific surface area of 206 m²/g (Denka Company Limited) as a conductive auxiliary agent. The results are shown in Table 2.

Example 10

A coin-type half-cell was manufactured according to the same method as Example 1 except for using acetylene black having a BET specific surface area of 215 m²/g (Denka Company Limited) as a conductive auxiliary agent. The results are shown in Table 2.

Comparative Example 1

A coin-type half-cell was manufactured according to the same method as Example 1 except that no coating layer 21a was formed. The results are shown in Table 2.

Comparative Example 2

A coin-type half-cell was manufactured according to the same method as Example 2 except that no coating layer 21a was formed. The results are shown in Table 2.

Comparative Example 3

A coin-type half-cell was manufactured according to the same method as Example 4 except that no coating layer 21a was formed. The results are shown in Table 2.

Comparative Example 4

A coin-type half-cell was manufactured according to the same method as Example 6 except no coating layer 21a was formed. The results are shown in Table 2.

Comparative Example 5

A coin-type half-cell was manufactured according to the same method as Example 7 except that no coating layer 21a was formed. The results are shown in Table 2.

Comparative Example 6

A coin-type half-cell was manufactured according to the same method as Example 8 except that no coating layer 21a was formed. The results are shown in Table 2.

Comparative Example 7

A coin-type half-cell was manufactured according to the same method as Example 2 except for using furnace black having a BET specific surface area 377 m²/g (Lion•Specialty•Chemical Co., Ltd.) as a conductive auxiliary agent. The results are shown in Table 2.

Comparative Example 8

A coin-type half-cell was manufactured according to the same method as Example 2 except for using furnace black having a BET specific surface area of 800 m²/g (Lion•Specialty•Chemical Co., Ltd.) as a conductive auxiliary agent. The results are shown in Table 2.

Comparative Example 9

A positive active material of Comparative Example 9 was prepared through the following process.

First, cobalt sulfate 5 hydrate was dissolved in ion exchange water to prepare a mixed aqueous solution. The weight of the cobalt sulfate 5 hydrate was 20 wt % based on the entire weight of the mixed aqueous solution.

Subsequently, a 40 wt % NaOH aqueous solution was added in a dropwise fashion to reaction layer ion exchange water, a predetermined amount (for example, 500 ml) of ion exchange water maintained at 50° C., to obtain a reaction layer aqueous solution, and the pH of the reaction layer aqueous solution was adjusted to 11.5. Subsequently, nitrogen gas was used to bubble the ion exchange water to remove oxygen dissolved therein.

Then, the reaction layer aqueous solution was stirred, and the mixed aqueous solution was added thereto at a speed of 3 ml/min, while the reaction layer aqueous solution was maintained at 50° C.

Subsequently, a 40 wt % NaOH aqueous solution and a 10 wt % $NH_3$ aqueous solution were added in a dropwise fashion to the obtained reaction layer aqueous solution to maintain the pH of the reaction layer aqueous solution at 11.5. The stirring was performed at a speed (a circumferential speed) of 4 m/s to 5 m/s for 10 hours. During this process, cobalt hydroxide was precipitated.

Subsequently, the cobalt hydroxide was suction-filtered from the reaction layer aqueous solution and then cleaned. The cleaned cobalt hydroxide was vacuum-dried. The vacuum drying was performed at 100° C. for 10 hours.

The dry cobalt hydroxide was ground with a mortar for several minutes to obtain dry powder. The dry powder was mixed with lithium carbonate ($Li_2CO_3$), aluminum nitrate 9 hydrate ($Al(NO_3)_3 \cdot 9H_2O$), and magnesium nitrate 6 hydrate ($Mg(NO_3)_2 \cdot 6H_2O$) to obtain mixed powder. A mole ratio Li, Co, Al, and Mg was 1.03:0.98:0.01:0.01.

Subsequently, the mixed powder was fired at 970° C. for 10 hours to prepare the positive active material of Comparative Example 9. The positive active material was a lithium cobalt oxide-based positive active material having a composition of $Li_{1.03}Co_{0.98}Al_{0.01}Mg_{0.01}O_2$. This positive active material had no spinel-type crystal structure, and thus, could not undergo charging and discharging under a high voltage.

An average particle diameter of the positive active material (an arithmetic average of every spherical particle diameter) was 13 μm when measured in the above method.

A coin-type half-cell was manufactured according to the same method as Example 2 except for using this positive active material. Herein, a cut-off voltage was in a range of 3.0 V to 4.6 V (Li/Li$^+$). The results are shown in Table 2.

Comparative Example 10

A coin-type half-cell was manufactured according to the same method as Comparative Example 9 except that no coating layer 21a was formed. The results are shown in Table 2.

Comparative Example 11

A positive active material of Comparative Example 11 was prepared in the following process.

First, nickel sulfate 6 hydrate, manganese sulfate 7 hydrate, and cobalt sulfate 5 hydrate were dissolved in ion exchange water to prepare a mixed aqueous solution. The total weight of the nickel sulfate 6 hydrate, the manganese sulfate 7 hydrate, and the cobalt sulfate 5 hydrate was 20 wt % based on the entire weight of the mixed aqueous solution. In addition, the nickel sulfate 6 hydrate, the manganese sulfate 7 hydrate, and the cobalt sulfate 5 hydrate were mixed in a mole ratio of 20:20:60=Ni:Co:Mn.

Subsequently, a 40 wt % NaOH aqueous solution was added in a dropwise fashion to a reaction layer ion exchange water, a predetermined amount (for example, 500 ml) of ion exchange water maintained at 50° C. to obtain a reaction layer aqueous solution, and the pH of the reaction layer aqueous solution was adjusted to be 11.5. Then, nitrogen gas was used to bubble the ion exchange water to remove oxygen dissolved therein.

The reaction layer aqueous solution was stirred, and the mixed aqueous solution was added thereto in a dropwise fashion at 3 ml/min, while the reaction layer aqueous solution was maintained at 50° C.

Subsequently, a 40 wt % NaOH aqueous solution and a 10 wt % NH$_3$ aqueous solution were added in a dropwise fashion to the obtained reaction layer aqueous solution, and pH of the reaction layer aqueous solution was maintained at 11.5. The stirring was performed at a speed (a circumferential speed) of 4 m/s to 5 m/s for 10 hours. Through the process, a hydroxide of each metal element was co-precipitated to respectively obtain hydroxide co-precipitates.

Subsequently, the hydroxide co-precipitates were suction-filtered and separated from the reaction layer aqueous solution and then, cleaned with ion exchange water. The cleaned hydroxide co-precipitate was vacuum-dried. The vacuum drying was performed at 100° C. for 10 hours.

The dry hydroxide co-precipitate was ground with a mortar for several minutes to obtain dry powder. The obtained dry powder was mixed with lithium carbonate (Li$_2$CO$_3$) to obtain mixed powder. Herein, Li and M (=Ni+Mn+Co) were included in a mole ratio of 1.4:1.

The mixed powder was fired at 800° C. for 10 hours to prepare the positive active material of Comparative Example 11. The positive active material was a solid solution-type positive active material having a composition of 0.4Li$_2$MnO$_3$-0.6Li (Ni$_{0.33}$Co$_{0.33}$Mn$_{0.33}$)O$_2$. This positive active material had no spinel-type crystal structure and could not undergo charging and discharging under a high voltage. A average particle diameter (an arithmetic average of every particle diameter) of the positive active material was 7 μm when measured by the aforementioned method.

A coin-type half-cell was manufactured according to the same method as Example 2 except for using this positive active material. Herein, a cut-off voltage was in a range of 2.5 V to 4.6 V (Li/Li$^+$). The results are shown in Table 2.

Comparative Example 12

A coin-type half-cell was manufactured according to the same method as Comparative Example 11 except that no coating layer 21a was formed. The results are shown in Table 2.

CONCLUSION

The cells of Examples 1 to 10 showed a remarkably improved cycle-life compared with the cells of Comparative Examples 1 to 6, which showed a sharply deteriorated cycle-life and thus no significant value.

It is believed that the reason for the inferior performance of Comparative Examples 1 to 6 was that since the positive current collector 21 was not covered with the coating layer 21a in Comparative Examples 1 to 6, aluminum ions were eluted from the current collector 21 during charge and discharge.

It may be assumed that a passivation layer was formed on the positive current collector 21 by the first charge and discharge cycle in Comparative Examples 1 to 6 but that the passivation layer was not sufficient to suppress the elution of aluminum ions which may have precipitated onto a negative electrode, thus sharply degrading the cycle-life.

On the other hand, the positive current collector 21 in Examples 1 to 10 was covered with the coating layer 21a and thus, the elution of aluminum ions was suppressed. Accordingly, the positive active material having the spinel-type crystal structure was combined with the positive current collector 21 covered with the coating layer 21a to realize high energy density and simultaneously, much improve a cycle-life.

In compared Examples 1, 2, and 4 to 10 with Example 3, the cells of Examples 1, 2, and 4 to 10 showed an excellent cycle-life compared with the cell of Example 3. Examples 1, 2, and 4 to 10 used a conductive auxiliary agent having a different BET specific surface area from that of Example 3.

In addition, the cells of Examples 1 to 10 showed a different cycle-life from that of Comparative Examples 7 and 8. Examples 1 to 10 used a conductive auxiliary agent having a different BET specific surface area from Comparative Examples 7 and 8.

These results show that an appropriate BET specific surface area for the conductive auxiliary agent ranges from 35 m$^2$/g to 350 m$^2$/g.

In addition, the cells of Comparative Examples 9 and 10 showed much a deteriorated cycle-life compared with the cells of Examples 1 to 10. The positive active materials of Comparative Examples 9 and 10 were not appropriate for high voltage charging and discharging and accordingly, exhibited a much deteriorated cycle-life. When the charging and discharging of the cells according to Comparative Examples 9 and 10 is performed under the same voltage to Examples 1 to 10, their cycle-life is easily expected to be deteriorated.

Accordingly, since charge and discharge in Comparative Examples 9 and 10 should be performed at a lower voltage than Examples 1 to 10, energy density is expected to be smaller.

On the other hand, a cycle-life change due to the coating layer 21a was not found in Comparative Examples 9 and 10. The reason is believed to be that Comparative Examples 9 and 10 were charged and discharged at a lower voltage than in Examples 1 to 10 and thus showed no high elution of aluminum.

It was evident from this result that the combination of the coating layer 21a and a positive active material having a spinel-type crystal structure provides a remarkable effect.

In addition, while Comparative Examples 11 and 12 showed a satisfactory cycle-life compared with Comparative Examples 9 and 10, Comparative Examples 11 and 12 showed a deteriorated cycle-life compared with Examples 1 to 10.

Since the positive active materials of Comparative Examples 11 and 12 were not appropriate for a high voltage, a cycle-life was deteriorated. It may be readily expected that if the charging and the discharging of the cells according to Comparative Examples 11 and 12 were to be performed under the same voltage to Examples 1 to 10, the cycle-life would be very surprisingly deteriorated.

It was evident from this result that when the charging and discharging was performed at a lower voltage in Comparative Examples 11 and 12 than that of Examples 1 to 10, energy density would be smaller.

On the other hand, a cycle-life change due to the coating layer 21a was not found in Comparative Examples 11 and 12. The reason is believed to be that since charging and discharging was performed at a lower voltage in Comparative Examples 11 and 12 than in Examples 1 to 10, elution of aluminum ions was not high.

It was evident from this, result that the combination of the coating layer 21a and the positive active material having the spinel-type crystal structure provided a remarkable effect.

By way of summation and review, a non-aqueous electrolyte secondary battery having excellent high energy density is desirable. In order to increase the energy density of a non-aqueous electrolyte secondary battery, a positive active material having a spinel-type crystal structure has been suggested. When this positive active material is used for the non-aqueous electrolyte secondary battery, the charge and the discharge at a voltage of greater than or equal to about 4.5V may be available.

However, in a non-aqueous electrolyte secondary battery using this positive active material a cycle-life of the battery may sharply deteriorate at a high temperature under a high voltage. In this regard, it is believed that when the battery is charged and discharged at a high temperature under a high voltage, metal ions are eluted from a positive current collector into an electrolyte solution. For example, when aluminum (Al) is used as the current collector, aluminum ions are eluted in the electrolyte solution. These metal ions may be precipitated onto a negative electrode and thus may form a coating layer thereon. In addition, this coating layer may increase battery resistance and thus cause the cycle-life characteristics deterioration. Also, aluminum precipitated on the negative electrode may pass through a separator, reach a positive electrode, and thus causes a minute short circuit and deteriorates a cycle-life characteristics.

In order to suppress the elution of the metal ions from the current collector, technology of forming a passivation layer on the surface of the current collector has been suggested. For example, when aluminum is used as the current collector, the current collector may be covered with an alumina ($Al_2O_3$) thin film or an aluminum fluoride ($AlF_3$) thin film.

This technology may be helpful when a battery is charged and discharged under a low voltage (for example, at about 4.3 V).

However, when a battery is charged and discharged at the aforementioned high temperature under the aforementioned high voltage, this technology may not sufficiently suppress the elution of the metal ions.

Embodiments provide a positive electrode for a non-aqueous electrolyte secondary battery having an improved cycle-life characteristics at a high temperature and at a high voltage.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A positive electrode for a non-aqueous electrolyte secondary battery, the positive electrode comprising:
   a positive current collector;
   a coating layer including graphite, the coating layer coating the positive current collector;
   a positive active material having a composition represented by Chemical Formula 1; and
   a conductive auxiliary agent having a BET specific surface area of about 39 $m^2/g$ to about 215 $m^2/g$, $$Li_xNi_yMn_{2-y-z}M_zO_4 \qquad \text{Chemical Formula 1}$$

wherein,
M is at least one metal element selected from a transition metal, aluminum, magnesium, gallium, indium, and lanthanum, the transition metal being a transition metal other than nickel (Ni) or manganese (Mn), and
x, y, and z are within the ranges: $0.02 \leq x \leq 1.10$, $0.25 \leq y \leq 0.6$, and $0.0 \leq z \leq 0.10$.

2. The positive electrode as claimed in claim 1, wherein in Chemical Formula 1, M is at least one metal selected from aluminum (Al), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce).

3. The positive electrode as claimed in claim 1, wherein in Chemical Formula 1, y is within the range of $0.40 \leq y < 0.60$.

4. The positive electrode as claimed in claim 1, wherein the BET specific surface area of the conductive auxiliary agent ranges from about 45 $m^2/g$ to about 215 $m^2/g$.

5. The positive electrode as claimed in claim 1, wherein the BET specific surface area of the conductive auxiliary agent ranges from about 100 $m^2/g$ to about 215 $m^2/g$.

6. The positive electrode as claimed in claim 1, wherein the BET specific surface area of the conductive auxiliary agent ranges from about 120 $m^2/g$ to about 215 $m^2/g$.

7. The positive electrode as claimed in claim 1, wherein the conductive auxiliary agent includes carbon black.

8. The positive electrode as claimed in claim 1, wherein the positive active material and the conductive auxiliary agent are combined in a positive active material layer that is coated on the coating layer.

9. A non-aqueous electrolyte secondary battery, comprising the positive electrode as claimed in claim 1;

a negative electrode; and an electrolyte including a non-aqueous solvent and a lithium salt.

10. The non-aqueous electrolyte secondary battery as claimed in claim 9, wherein the non-aqueous solvent includes at least one fluoro-based non-aqueous solvent.

* * * * *